(No Model.)
R. B. ANDERSON.
MILK CAN OR CARRIER.
No. 315,371. Patented Apr. 7, 1885.
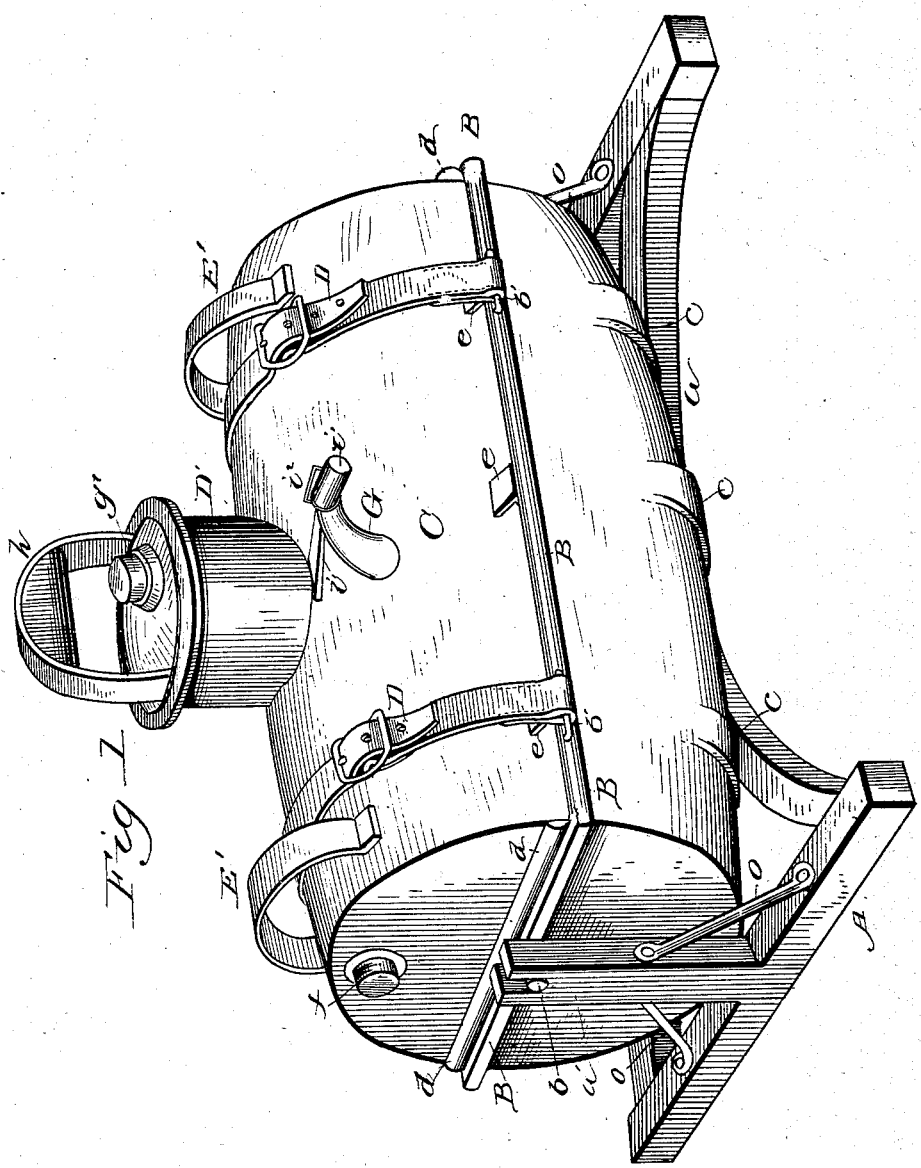
WITNESSES:
INVENTOR
Robert B. Anderson
BY
ATTORNEY (No Model.)
R. B. ANDERSON.
MILK CAN OR CARRIER.
No. 315,371. Patented Apr. 7, 1885.
2 Sheets—Sheet 2.
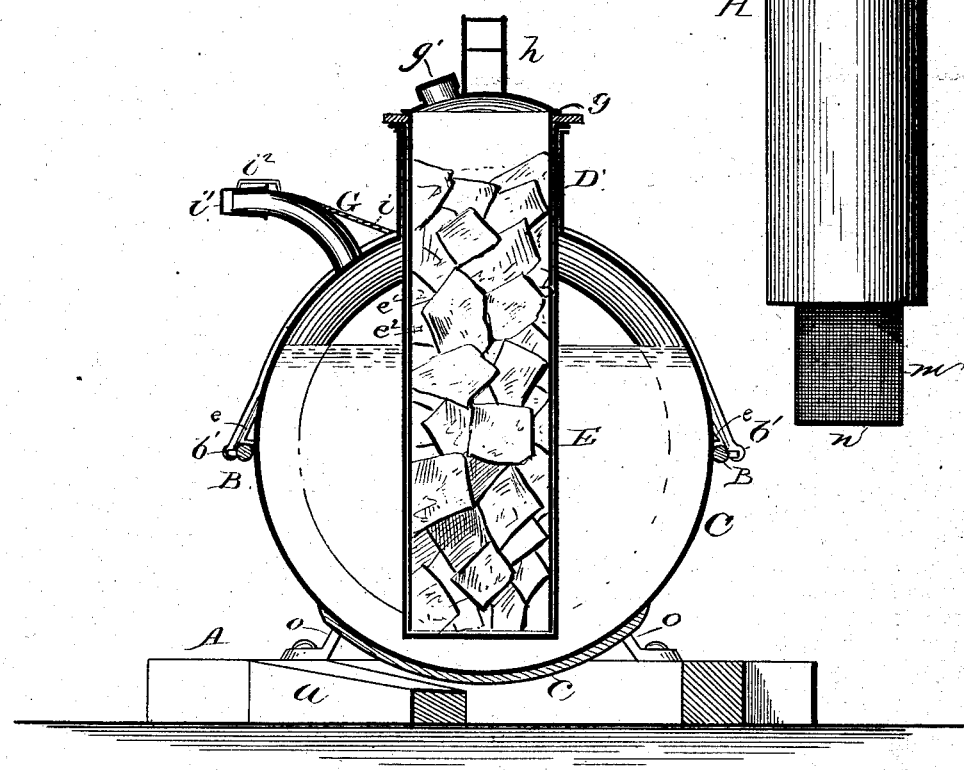
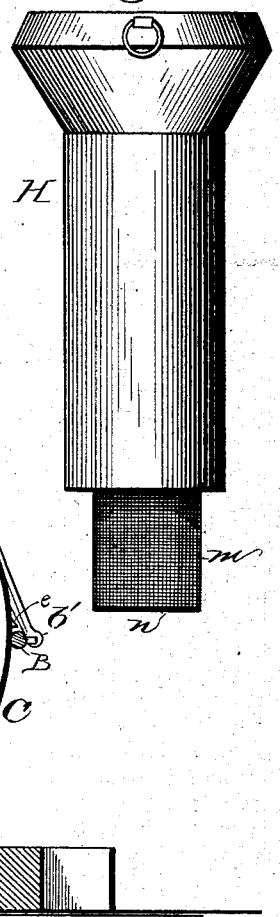
WITNESSES:
INVENTOR
Robert B. Anderson
BY
ATTORNEY

UNITED STATES PATENT OFFICE.

ROBERT B. ANDERSON, OF BAY CITY, MICHIGAN.

MILK CAN OR CARRIER.

SPECIFICATION forming part of Letters Patent No. 315,371, dated April 7, 1885.

Application filed November 14, 1884. (No model.)

*To all whom it may concern:*

Be it known that I, ROBERT B. ANDERSON, of Bay City, in the county of Bay and State of Michigan, have invented certain new and useful Improvements in Milk Cans or Carriers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention has relation to a can or vessel for containing milk or such substances during its transportation from place to place; and it consists, substantially, in the parts as constructed, and in the particular combinations to be hereinafter distinctly described, and pointed out in the claims.

In the transportation of milk in cans as heretofore constructed it frequently happens that, owing to the long distances from which it sometimes has to be brought, the constant jolting of the wagon so agitates or stirs the substance as to bring it to a state or condition entirely unfit for use.

One reason for the above objectionable feature is that the cans or vessels for containing the milk are not afforded any means for conforming to the movement of the wagon or vehicle in which they are carried, and consequently the milk is most always kept in agitation from constant jolting, due to inequalities of level in the roads over which the vehicle passes or is caused to travel.

My invention was devised for the purpose of overcoming this objection, and in constructing a can or vessel in accordance therewith the milk may be kept in a state of almost perfect equilibrium. I propose to suspend the can or vessel in a suitable support, by which, when properly placed within the transporting vehicle, all lateral or sidewise movements of the latter will be received by the vessel in such manner as not to be distributed among the particles of the contained substance to any material or injurious extent.

Referring to the annexed sheets of drawings, Figure 1 represents a perspective view of a complete device as constructed in accordance with my invention; Fig. 2, a view thereof in cross-section, and Fig. 3 represents a view in detail of the straining-vessel.

Reference being had to the letters marked thereon, A represents the base of the can-support, having an inwardly-curved front piece or strip, $a$, and two vertical standards, $a'$ $a'$, that are strengthened at each side by diagonal braces $o$ $o$. The standards $a'$ $a'$ are formed or recessed at the top for the reception of pintles $b$, projecting from the side of a rectangular frame, B, constructed of iron or any proper material. The said frame B is provided at transversely-opposite sides with loops $b'$ $b'$.

C represents the can or vessel, which, as shown, approximates in shape to a barrel, it being formed on its under side with outwardly-extending ribs or flanges $c$ $c$ $c$, which serve as rockers for the vessel when taken out of its supporting-frame and placed on the floor. The heads or ends of the can are provided with a rib or flange, $d$, while at opposite points of its circumference it is provided with lugs $e$ $e$ $e$, such being the means by which the vessel is supported in the frame B, as shown. Secured in the loops $b'$ of the frame B are straps D D, which, when the vessel is placed in the frame, are brought over the tops and secured by buckling or otherwise. By this means the can is prevented from being unseated from its position in case of sudden jolting. In one end of the can I provide a vent-opening closed by a screw-cap, $f$. In the top of the can is provided the filling-opening, which is surmounted by an annular flange or collar, D'. Into this filling-opening I insert a depending ice-tube, E, which in summer-time is kept filled with ice to keep the milk cool and fresh, while in winter-time it may be filled with warm water to prevent congelation or freezing. The ice-tube consists of two concentric shells, $e'$ $e^2$, one fitting down into the other, as shown, the inner one being formed with a flanged top, $g$, or lid, between which and a small flange on the top edge of the outer one is placed a packing-ring, $e^3$, of rubber, leather, or other proper material. The lid or top of the inner shell is provided with a vent-opening closed by a screw-cap, $g'$, and is formed with a suitable handle, $h$, by which it may be lifted or drawn out. The top of the vessel C is formed at or near the ends with handles E' E', by which it may be lifted or carried about, and in the side thereof is provided a suitable spout, G, strengthened by a small brace, $i$, and provided with a cap or cover, $i'$, which is provided in its top with a slot, by which it is free to be moved over a loop, $i^2$, secured to the spout at the top. The cap $i'$ may be fitted to or taken off the spout without removal from the loop $i^2$, thereby prevented from being lost.

H, Fig. 3, represents the strainer and filler, which consists of a cylinder or tube formed at its top with a conical or funnel shaped neck having at either side a lifting-ring, and provided at its lower extremity with a reticulated extension, $m$, having a solid bottom, $n$. When the milk is poured into the vessel through this strainer, any particles of extraneous matter of appreciable bulk will be re-strained and deposited on the bottom $n$.

All the parts can be readily washed or cleansed, and also repaired or replaced when worn. It is preferable to place the filled can and its support lengthwise in the transporting vehicle, so that all sidewise movement will give to the can a swinging motion, and thus not churn or stir the milk to any injurious extent, the direction of the moving force of the vehicle being generally rectilinear or even, and having little or no effect on the vessel and its contents.

The object of the inwardly-curved front piece, $a$, is to permit the can to be tilted forward sufficiently far to enable its entire contents to be emptied from the vessel, and to enable the cup or vessel into which it is to be emptied to be placed properly under the spout.

Having thus described my invention, what I claim is—

1. The combination of the base A, having inwardly-curved front piece and the vertical standards, the frame B, having the pintles, and the can or vessel having the supporting lugs or flanges $d$ and $e$, substantially as described.

2. The combination of the base A, having the standards $a'$ $a'$, having bearing-recesses in their tops, the rectangular frame having the pintles, which rest in said slots, and provided with the loops $b'$, the can having the flange $d$ and lugs $e$, and ribs $c$, and the straps D D, for securing the can, substantially as described.

3. The combination, with the frame B and the supporting-base, of the can C, having vent $f$ and handles E' E', and provided with the collar D' and a suitable spout, and the straps D D, by which the can is secured in the frame, substantially as described.

In testimony that I claim the foregoing as my own I affix my signature in presence of two witnesses.

ROBERT B. ANDERSON.

Witnesses:
JNO. C. HEWITT,
W. A. PETTAPIECE.